United States Patent
Kaneko et al.

[11] Patent Number: 5,175,134
[45] Date of Patent: Dec. 29, 1992

[54] CERAMIC TILE PRODUCED FROM SLUDGE SLAG

[75] Inventors: Senji Kaneko, 189, Iwasaki-Cho, Hodogaya-Ku; Takashi Shindo, 2-503, 1-Chome, Nagata Minamidai, Minami-Ku, both of Yokohama City, Kanagawa Pref.; Atsuo Inokawa, Tokyo; Yasushi Hoshino, Tokyo; Takashi Otsuka, Tokyo; Katsuhiro Wakasugi, Tokyo; Masaru Takikawa, Tokyo, all of Japan

[73] Assignees: Senji Kaneko; Takashi Shindo, both of Yokohama City; NKK Corporation; Shinagawa Shirorenga K.K., both of Tokyo, all of Japan

[21] Appl. No.: 746,853

[22] Filed: Aug. 19, 1991

[30] Foreign Application Priority Data
Sep. 12, 1990 [JP] Japan .................. 2-241912

[51] Int. Cl.⁵ .......... C04B 33/00; C04B 35/16; C04B 35/18; C04B 35/00
[52] U.S. Cl. .......... 501/155; 501/141; 501/154
[58] Field of Search .......... 501/141, 144, 154, 155; 428/330; 106/697, 700, 705, 707, 789, 790

[56] References Cited
U.S. PATENT DOCUMENTS

| | | | |
|---|---|---|---|
| 4,751,208 | 6/1988 | Aoki et al. | 501/114 |
| 4,885,203 | 12/1989 | Wakat | 428/220 |
| 4,911,757 | 3/1990 | Lynn et al. | 106/85 |

OTHER PUBLICATIONS
Hawley's Condensed Chemical Dictionary, 11th Edition, 1987, Reinhold Company Inc., p. 1038.

Primary Examiner—Mark L. Bell
Assistant Examiner—Michael A. Marcheschi
Attorney, Agent, or Firm—Frishauf, Holtz, Goodman & Woodward

[57] ABSTRACT

The ceramic tile using sludge slag of the present invention comprises:

| | |
|---|---|
| sludge slag | from 5 to 70 wt. %, |
| agalmatolite | from 20 to 90 wt. %, |
| clay | from 5 to 50 wt. %, |
| and the balance being incidental impurities. | |

The sludge slag is obtained by separating sludge from sewage, burning the thus separated sludge into ash, melting the resultant ash and solidifying the thus melted ash. The sludge slag consists essentially of:

| | |
|---|---|
| silicon dioxide ($SiO_2$) | from 10 to 50 wt. %, |
| aluminum oxide ($Al_2O_3$) | from 3 to 20 wt. %, |
| phosphorous pentoxide ($P_2O_5$) | from 1 to 30 wt. %, |
| calcium oxide (CaO) | from 10 to 70 wt. %, |
| magnesium oxide (MgO) | from 0.5 to 20 wt. %, |
| and iron oxide ($Fe_2O_3$) | from 5 to 25 wt. %. |

13 Claims, 2 Drawing Sheets

CERAMIC TILE PRODUCED FROM SLUDGE SLAG

BACKGROUND OF THE INVENTION

1. Field of the Invention

The present invention relates to a ceramic tile using a sludge slag which is available from sludge separated from sewage.

Along with the popularization of the sewage system, the quantity of produced sludge such as grit and screenings in sewage is yearly increasing. Sludge has so far mostly been disposed of by burning same into ash and dumping the produced ash onto land or into the sea. However, the increasing tendency toward urbanization is making it more and more difficult to find places for dumping. It is also necessary to convert detrimental heavy metals contained in sludge into insoluble substances. The treatment of sludge is thus an important social issue at present, and the general attention is attracted to the effective utilization of sludge as a useful resource.

Typical raw materials for ceramic tiles used in building purposes include clay, agalmatolite, silica sand and feldspar. Functions of these raw materials for conventional ceramic tiles are described below.

Clay comprises essentially kaolin, and has a function of a binder. When making a formed body by means of a press, clay has a function of improving formability of the formed body. In addition, clay has a function of melting during firing to fasten aggregates to each other.

Agalmatolite has a function as an aggregate and as a binder. Agalmatolite is economically advantageous for the low cost.

Silica sand has a function as an aggregate. Silica sand is however a raw material hindering a sintering reaction.

Feldspar has a function of melting during firing to fasten aggregates to each other and a function of reducing a firing temperature. A raw material which, like feldspar, contains alkaline elements and melts during firing, thus fastening aggregates to each other and reducing the firing temperature, is called a sintering agent. Feldspar contains also aluminum oxide ($Al_2O_3$) and silicon dioxide ($SiO_2$) Apart from feldspar, borax ($Na_2 B_4O_7.10H_2O$), sodium silicate ($Na_2SiO_3$) and potassium silicate ($K_2O.SiO_2$) are employed as the sintering agents.

When manufacturing a ceramic tile from clay, silica sand and feldspar, feldspar is added in an amount within a range of from 20 to 40 wt. %, or from 20 to 50 wt. % in some cases. However, because feldspar contains alkaline elements in an amount of only from 14 to 15 wt. %, a firing temperature of over 1,200° C. is required in order to obtain a ceramic tile having a water absorption rate of up to 5%. For the purpose of decreasing the firing temperature, the usual practice is to use limestone. When using limestone, however, it is difficult to obtain a ceramic tile having a low water absorption rate of up to 5%. In order to reduce the firing temperature of the ceramic tile and the water absorption rate of the ceramic tile, therefore, it is necessary to use a raw material containing much alkaline elements, such as an alkali, an alkaline metal and an alkali earth metal.

Borax, which contains much alkaline elements, is a raw material present in large quantities in the natural world and stably available. The chemical composition of borax is not however constant. It is therefore the common practice to use a frit of borax obtained by melting borax and solidifying the molten borax (hereinafter referred to as the "frit"). The frit has a stable chemical composition and is not susceptible to degeneration.

However, the raw material cost of ceramic tiles is now increasing as a result of the shortage and the resulting price increase of the above-mentioned raw materials of ceramic tiles. There has therefore been a demand for the development of a new raw material for a ceramic tile other than those described above. With such circumstances in view, studies were carried out to consider the use of ash, which is obtained by separating sludge from sewage, and burning the separated sludge into a sludge ash, as a sintering agent in place of the above-mentioned feldspar and borax.

The sludge ash is not however stable in the chemical composition thereof and has a high melting point. The reason is that the sludge ash has a low ratio ($CaO/SiO_2$) of the calcium oxide (CaO) content to the silicon dioxide ($SiO_2$) content (this ratio of $CaO/SiO_2$ is hereinafter referred to as the "basicity"). When using the sludge ash as a sintering agent for manufacturing a ceramic tile, therefore, the firing temperature of the ceramic tile cannot be reduced. For this reason, the sludge ash is not suitable, as it is, as a raw material for a ceramic tile.

SUMMARY OF THE INVENTION

An object of the present invention is therefore to provide a ceramic tile using a sludge slag, which permits effective utilization of sludge contained in sewage and reduction of the raw material cost of ceramic tiles.

In accordance with one of the features of the present invention, there is provided a ceramic tile using a sludge slag, which comprises:

a sludge slag obtained by separating sludge from sewage, burning the thus separated sludge into ash, melting said ash and solidifying the thus melted ash

| | |
|---|---|
| | from 5 to 70 wt. %, |
| agalmatolite | from 20 to 90 wt. %, |
| clay | from 5 to 50 wt. %, |
| and | |
| the balance being incidental impurities. | | where, the total amount of sodium oxide ($Na_2O$) and potassium oxide ($K_2O$) as said incidental impurities being up to 5 wt. %; and said sludge slag consisting essentially of:

| | |
|---|---|
| silicon dioxide ($SiO_2$) | from 10 to 50 wt. %, |
| aluminum oxide ($Al_2O_3$) | from 3 to 20 wt. %, |
| phosphorous pentoxide ($P_2O_5$) | from 1 to 30.wt. %, |
| calcium oxide (CaO) | from 10 to 70 wt. %, |
| magnesium oxide (MgO) | from 0.5 to 20 wt. %, |
| and iron oxide ($Fe_2O_3$) | from 5 to 25 wt. %. |

Said ceramic tile may further selectively contain silica sand, as required, in an amount within a range of from 1 to 50 wt. %.

Said ceramic tile may further selectively contain an alkaline element, as required, in an amount within a range of from 1 to 5 wt. %.

DETAILED DESCRIPTION OF PREFERRED EMBODIMENTS

Extensive studies were carried out to solve the above-mentioned problems. As a result, the following findings were obtained:

(1) The melting point of a sludge slag obtained by separating sludge from sewage, burning the thus separated sludge into ash, melting the ash, and solidifying the thus melted ash, can be brought to a temperature lower than the melting point of the ash of the sludge by adjusting the ratio ($CaO/SiO_2$) of the calcium oxide (CaO) content to the silicon dioxide ($SiO_2$) content to a desired value.

(2) By using the sludge slag having a melting point lower than that of the ash of the sludge as a sintering agent for the manufacture of a ceramic tile, the sludge slag is melted during firing to fasten aggregates to each other, and reduces the firing temperature.

The present invention was made on the basis of the above-mentioned findings. A ceramic tile using a sludge slag of the present invention comprises:

a sludge slag obtained by separating sludge from sewage, burning the thus separated sludge into ash, melting said ash and solidifying the thus melted ash

| | |
|---|---|
| agalmatolite | from 5 to 70 wt. %. |
| clay | from 20 to 90 wt. %. |
| and | from 5 to 50 wt. %. |
| the balance being incidental impurities. | | where, the total amount of sodium oxide ($Na_2O$) and potassium oxide ($K_2O$) as said incidental impurities being up to 5 wt. %; and said sludge slag consisting essentially of:

| | |
|---|---|
| silicon dioxide ($SiO_2$) | from 10 to 50 wt. %. |
| aluminum oxide ($Al_2O_3$) | from 3 to 20 wt. %. |
| phosphorus pentoxide ($P_2O_5$) | from 1 to 30 wt. %. |
| calcium oxide (CaO) | from 10 to 70 wt. %. |
| magnesium oxide (MgO) | from 0.5 to 20 wt. %. |
| and | |
| iron oxide ($Fe_2O_3$) | from 5 to 25 wt. %. |

Said ceramic tile may further selectively contain silica sand, as required, in an amount within a range of from 1 to 50 wt. %.

Said ceramic tile may further selectively contain an alkaline element, as required, in an amount within a range of from 1 to 5 wt. %.

First, the process of obtaining a sludge slag from sludge is described below with reference to the drawings.

Sludge is separated from sewage, and the thus separated sludge is thickened in a thickening equipment. The thickened sludge is dewatered in a dewatering equipment. Then, the dewatered sludge is further dried into a cakey state.

Figure 1:
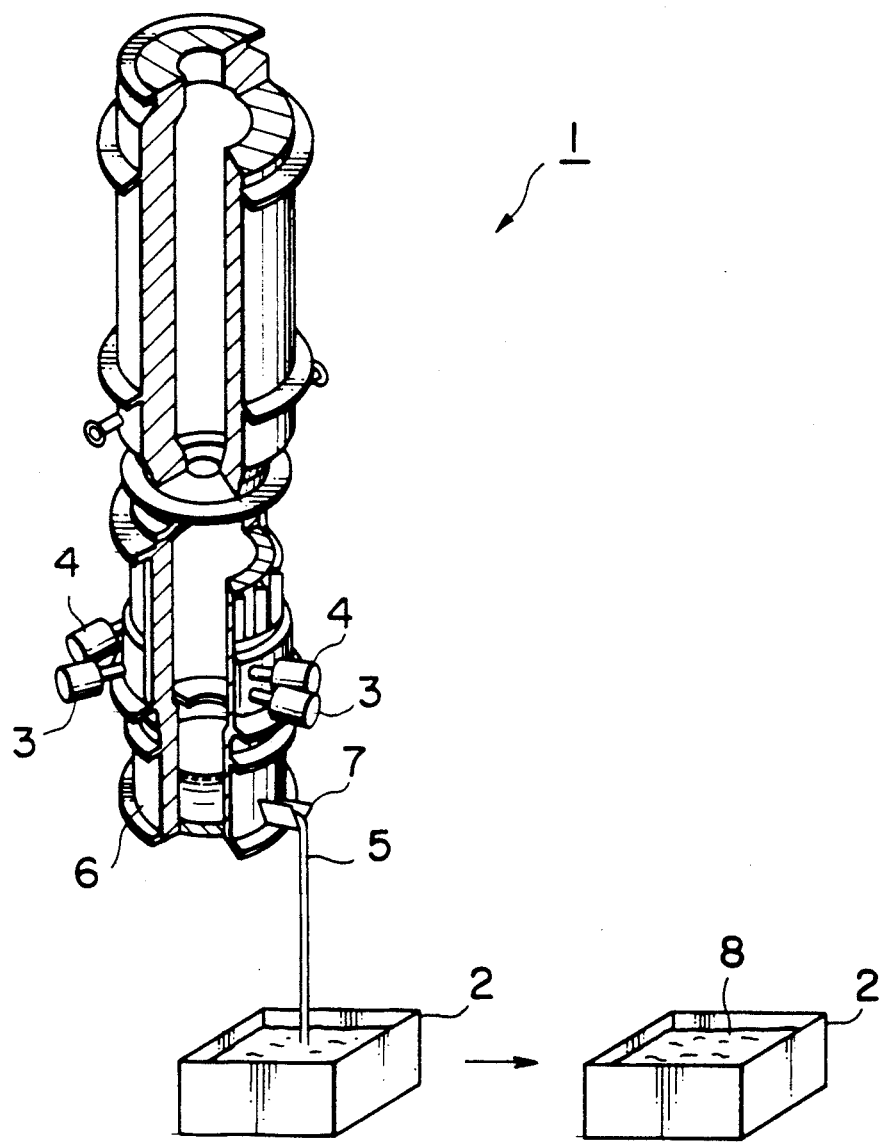
FIG. 1. is a partially cutaway perspective view illustrating a melting furnace and a sludge slag container.

A sludge slag is then prepared by means of a melting furnace 1 and a sludge slag container 2 shown in FIG. 1. More specifically, in the melting furnace 1, 3 is a burner, and 4 is a sludge supply port. A mixture of the dried sludge in the cakey state and a calcium content adjusting agent described later is supplied into the melting furnace 1 through the sludge supply port 4, and a high-temperature combustion gas is blown into the melting furnace 1 through the burner 3 to burn the mixture into ash of sludge. The resultant sludge ash is then melted by the high-temperature conbustion gas from the burner 3 into a liquid sludge slag 5. The thus obtained liquid sludge slag 5 is once stored in a sludge slag sump 6, and then discharged through a sludge slag discharge port 7 into the sludge slag container 2 arranged below the sludge slag discharge port 7. The liquid sludge slag 5 received in the sludge slag container 2 is cooled and solidified in the sludge slag container 2, and thus a solid sludge slag 8 is obtained.

Alternatively, a solid sludge slag may be obtained by burning the dried sludge in the cakey state in an incinerator other than the above-mentioned melting furnace 1 to obtain a sludge ash, adding a calcium content adjusting agent to the resultant sludge ash, mixing these substances to form a mixture, then, melting the resultant mixture in the melting furnace 1 in the same manner as described above, and cooling the obtained liquid sludge slag.

Now, the reason of limiting the chemical composition of the sludge slag used in the present invention and the chemical composition of the ceramic tile using the sludge slag of the present invention within the above-mentioned ranges are described below.

(1) Sludge slag

The sludge slag has a function of melting during firing to fasten aggregates to each other and a function of reducing the firing temperature. With a sludge slag content of over 70 wt. %, however, the contents of clay and agalmatolite decrease, and formability of a formed body when making the formed body by means of a press becomes poorer, with a decreased strength of the ceramic tile. In addition, a sludge slag content of over 70 wt. % leads to a narrower range of the firing temperature. With a sludge slag content of under 5 wt. %, on the other hand, a desired effect cannot be obtained in the function of melting during firing to fasten aggregates to each other and in the function of reducing the firing temperature. The sludge slag content should therefore be limited within a range of from 5 to 70 wt. %.

1) Silicon Dioxide ($SiO_2$)

Silicon dioxide increases the melting point of the sludge slag. The function of the sludge slag of reducing the firing temperature is obtained by reducing the melting point of the sludge slag. A silicon dioxide content of over 50 wt. %, leads to a higher melting point of the sludge slag and a higher firing temperature. A silicon dioxide content of under 10 wt. % results, on the other hand, in an increased calcium oxide content described later as a matter of course, and an increased melting point of the sludge slag as well. The silicon dioxide content should therefore be limited within a range of from 10 to 50 wt. %.

2) Calcium oxide (CaO)

Calcium oxide has a function of reducing the melting point of the sludge slag. With a calcium oxide content of over 70 wt. %, however, the melting point of the sludge slag increases on the contrary, and the sludge slag tends to react more easily with water and carbon dioxide ($CO_2$) gas during storage thereof, leading to degeneration of the sludge slag. With a calcium oxide content of under 10 wt. %, a desired effect as described above of reducing the melting point of the sludge slag is not available. The calcium oxide content should therefore be limited within a range of from 10 to 70 wt. %.

3) Aluminum oxide ($Al_2O_3$)

Aluminum oxide increases the melting point of the sludge slag. An aluminum oxide content of over 20 wt. % results in a higher melting point of the sludge slag. Aluminum oxide is usually contained, on the other hand, in the sludge ash in an amount of at least 3 wt. %. The aluminum oxide content should therefore be limited within a range of from 3 to 20 wt. %.

4) Phosphorus Pentoxide ($P_2O_5$)

Phosphorus pentoxide has a function of reducing the melting point of the sludge slag. With a phosphorus pentoxide content of over 30 wt. %, however, the melting point of the sludge slag decreases excessively, and the sludge slag tends to react more easily with water and carbon dioxide ($CO_2$) gas during storage thereof, leading to degeneration of the sludge slag. On the other hand, phosphorus pentoxide is usually contained in the sludge ash in an amount of at least 1 wt. %. The phosphorus pentoxide content should therefore be limited within a range of from 1 to 30 wt. %.

5) Magnesium oxide (MgO)

Magnesium oxide has a function of reducing the melting point of the sludge slag. With a magnesium oxide content of over 20 wt. %, however, the melting point of the sludge slag increases on the contrary. Magnesium oxide is usually contained, on the other hand, in the sludge ash in an amount of at least 0.5 wt. %. The magnesium oxide content should therefore be limited within a range of from 0.5 to 20 wt. %.

6) Iron oxide ($Fe_2O_3$)

Iron oxide has a function of keeping the tone of color of the ceramic tile. With an iron oxide content of under 5 wt. % or over 25 wt. %, however, a desired effect as described above is unavailable. The iron oxide content should therefore be limited within a range of from 5 to 20 wt. %.

7)

In order to reduce the firing temperature of the ceramic tile to a temperature of up to 1,200° C., it is necessary to reduce the melting point of the sludge slag to a temperature of up to 1,200° C. In order to reduce the melting point of the sludge slag to a temperature of up to 1,200° C., the ratio ($CaO/SiO_2$) of the calcium oxide (CaO) content to the silicon dioxide ($SiO_2$) content should be limited within a range of from 0.2 to 7.0. For the purpose of adjusting the ratio of $CaO/SiO_2$, a calcium content adjusting agent is added to the dried sludge or the sludge ash. Calcium carbonate ($CaCO_3$) or dolomite ($CaMg(CO_3)_2$) is used as the calcium content adjusting agent. By adding the calcium content adjusting agent, it is possible to bring the ratio of $CaO/SiO_2$ within a range of from 0.2 to 7.0, and control the firing temperature within a low temperature range of from 1,120° to 1,200° C.

In the process of manufacturing the sludge slag, the viscosity of the liquid sludge slag available by melting the sludge ash, should preferably be as small as possible, more particularly, under 20 poise. With a viscosity of the liquid sludge slag of at least 20 poise, the liquid sludge slag clogs off the melting furnace 1, resulting in an operational disadvantage. In order to reduce the viscosity of the liquid sludge slag, it is necessary to adjust the ratio ($CaO/SiO_2$) of the calcium oxide (CaO) content to the silicon dioxide ($SiO_2$) content within a desired range. By limiting the ratio of $CaO/SiO_2$ within a range of from 0.2 to 7.0, as described above, it is possible to keep viscosity of the liquid sludge slag at a level of under 20 poise.

An amount of the calcium content adjusting agent should preferably be within a range of from 20 to 60 wt. % relative to the total amount of the sludge ash and the calcium content adjusting agent. With a content of the calcium content adjusting agent of under 20 wt. % or over 60 wt. %, the ratio ($CaO/SiO_2$) of the calcium oxide (CaO) content to the silicon dioxide ($SiO_2$) content cannot be maintained within a range of from 0.2 to 7.0.

The manner of adding the calcium content adjusting agent is as follows: The calcium content adjusting agent is added to the dried sludge, and these substances are mixed to form a mixture. Then, the resultant mixture is supplied into the melting furnace 1. Or, the calcium content adjusting agent is added to the sludge ash obtained by burning the dried sludge in an incinerator, and these substances are mixed to form a mixture. Then, the resultant mixture is supplied into the melting furnace 1.

8)

Sludge usually contains inevitably sodium oxide ($Na_2O$) and potassium oxide ($K_2O$) With a view not to impairing the object of the present invention, the contents of sodium oxide and potassium oxide should be minimized. The total amount of sodium oxide and potassium oxide should therefore be up to 5 wt. %.

(2) Agalmatolite

Agalmatolite has functions not only as an aggregate but also as a binder. An agalmatolite content of over 90 wt. % results however in a higher firing temperature. With an agalmatolite content of under 20 wt. %, on the other hand, a desired effect as described above is unavailable, with a narrower range of the firing temperature. The agalmatolite content should therefore be limited within a range of from 20 to 90 wt. %.

(3) Clay

Clay has a function as a binder. Clay has also a function of improving, when making a formed body by means of a press, formability of the formed body. In addition, clay has a function of melting during firing to fasten aggregates to each other. A clay content of over 50 wt. % leads however to a larger shrinkage of the formed body during firing, thus causing cracks in the ceramic tile. A clay content of under 5 wt. % leads, on the other hand, to a poorer formability of the formed body when making same by means of a press, and to a lower strength of the ceramic tile. The clay content should therefore be limited within a range of from 5 to 50 wt. %.

(4) Silica sand

Silica sand has a function as an aggregate, and a function of minimizing the variation in the volume of the formed body during firing. In the present invention, therefore, silica sand is selectively added as required. A silica sand content of over 50 wt. % however impairs the sintering reaction, so that the formed body does not show a prescribed shrinkage during firing, and causes an increased water absorption rate of the ceramic tile. With a silica sand content of under 1 wt. %, on the other hand, a desired effect as described above is not available. The silica sand content should therefore be limited within a range of from 1 to 50 wt. %.

(5) Alkaline element

An alkaline element has a function of melting during firing to fasten aggregates to each other, and a function of reducing the firing temperature. In the present invention, therefore, the alkaline element is selectively added as required. Sodium silicate ($Na_2SiO_3$) and potassium silicate ($K_2O\ SiO_2$) are used as the alkaline element. With a content of the alkaline element of over 5 wt. %, however, a complete dissolution of the alkaline element cannot be achieved when mixing with the other raw materials with added water, and formability of the formed body is impaired when forming the formed body by means of a press. With a content of the alkaline element of under 1 wt. %, on the other hand, a desired effect as described above is unavailable. The content of the alkaline element should therefore be limited within a range of from 1 to 5 wt. %.

Figure 2:
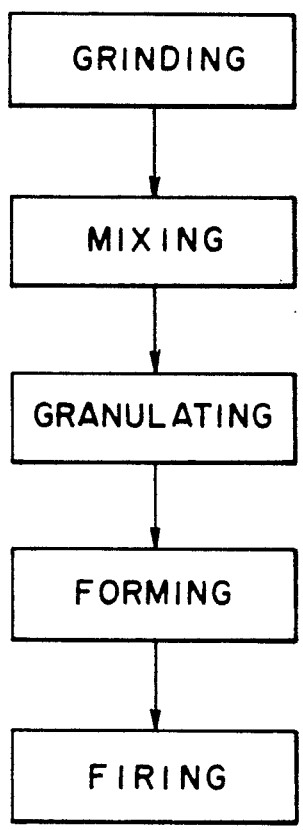
FIG. 2. is a flow diagram illustrating the manufacturing process of a ceramic tile.

Now, the method for manufacturing a ceramic tile using a sludge slag of the present invention is described with reference to the drawings. FIG. 2 is a flow diagram illustrating a manufacturing process of the ceramic tile. The ceramic tile of the present invention is manufactured by the following common manufacturing process of ceramic tiles: The sludge slag, agalmatolite, clay and other raw materials used as required are grinded, to prepare respective powders. Then, the thus prepared powders are mixed with each other to form a mixture. Then, water is added to the resultant mixture. The mixture added with water is further mixed into a slurry mixture. The slurry mixture is then granulated to prepare granules. Then, the thus prepared granules are press-formed by means of a press into a formed body having a prescribed shape and prescribed dimensions. The formed body thus prepared is dried and fired, thereby manufacturing the ceramic tile.

Now, the ceramic tile using the sludge slag of the present invention is described further in detail by means of examples, while comparing with samples for comparison outside the scope of the present invention.

EXAMPLE

Sludge was separated from sewage, and the separated sludge was thickened in a thickening equipment. The thickened sludge was dewatered in a dewatering equipment. Then, the dewatered sludge was further dried. Then, calcium carbonate ($CaCO_3$) was added as a calcium content adjusting agent to the dried sludge, and these substances were mixed to form a mixture.

Then, a sludge slag having a chemical composition within the scope of the present invention was prepared by means of the melting furnace 1 and the sludge slag container 2 as shown in FIG. 1. More specifically, the mixture thus formed as described above was supplied into the melting furnace 1 through the sludge supply port 4, and a high-temperature combustion gas was blown into the melting furnace 1 through the burner 3 to burn the mixture into a sludge ash. The resultant sludge ash was then melted by the high-temperature combustion gas from the burner 3 into a liquid sludge slag 5. The thus obtained liquid sludge slag 5 was once stored in the sludge slag sump 6, and then discharged through the sludge slag discharge port 7 into the sludge slag container 2 arranged below the sludge slag discharge port 7. The liquid sludge slag 5 received in the sludge slag container 2 was cooled and solidified in the sludge slag container 2, and thus a solid sludge slag 8 was obtained. The chemical composition of the thus obtained solid sludge slag is shown in Table 1.

TABLE 1

| | Solid sludge slag | Agalmatolite | Silica sand | Clay | (wt. %) Sodium silicate |
|---|---|---|---|---|---|
| Ignition loss | — | 2.16 | 0.22 | 10.48 | — |
| $SiO_2$ | 36 | 77.71 | 97.70 | 54.08 | 56–61 |
| $Al_2O_3$ | 16 | 14.37 | 1.15 | 30.52 | — |
| $P_2O_5$ | 5 | — | — | — | — |
| $Fe_2O_3$ | 7 | 0.69 | 0.06 | 1.75 | — |
| CaO | 28 | 0.06 | 0.02 | 0.16 | — |
| MgO | 2 | 0.18 | 0.04 | 0.21 | — |
| $Na_2O$ | 1 | 0.48 | 0.80 | 0.13 | 17–20 |
| $K_2O$ | 1 | 3.88 | — | 1.88 | — |
| $TiO_2$ | 1 | 0.19 | 0.04 | 0.66 | — |

Then, the solid sludge slag thus obtained, and agalmatolite, silica sand and clay having respective chemical compositions as shown in Table 1, were separately grinded to prepare respective powders. Then, the thus prepared powders of the sludge slag, agalmatolite, silica sand and clay, and the powder of sodium silicate having the chemical composition as shown in Table 1 were mixed with each other at a mixing ratio within the scope of the present invention as shown in Table 2 to form a mixture.

Then, water was added to the resultant mixture. The mixture added with water was further mixed into a slurry mixture. The slurry mixture was then granulated by means of a spray drier into granules. Then, the thus prepared granules were press-formed by means of a press into a formed body having a length of 80 mm, a width of 60 mm, and a thickness of 10 mm. The forming pressure applied when press-forming the formed body and the water content in the formed body are shown in Table 2. The formed body thus prepared was dried. The dried formed body had a water content of about 1 wt. %. Then, the dried formed body was fired for one hour at a firing temperature shown in Table 2, to prepare samples of ceramic tiles within the scope of the present invention (hereinafter referred to as the "samples of the invention") Nos. 1 to 9.

For comparison purposes, respective powders of the solid sludge slag, agalmatolite, silica sand, clay and sodium silicate having respective chemical compositions as shown in Table 1, were mixed with each other at a mixing ratio outside the scope of the present invention as shown in Table 3 to form a mixture. Then, water was added to the resultant mixture. The mixture added with water was further mixed into a slurry mixture. The slurry mixture was then granulated by means of a spray drier into granules. Then, the thus prepared granules were press-formed by means of a press into a formed body having the same dimensions as those of the samples of the invention Nos. 1 to 9. The forming pressure applied when press-forming the formed body and the water content in the formed body are shown in Table 3. The formed body thus prepared was dried. The dried formed body had a water content of about 1 wt. %. Then, the dried formed body was fired for one hour at a firing temperature shown in Table 3, to prepare samples of ceramic tiles outside the scope of the present invention (hereinafter referred to as the "samples for comparison") Nos. 1 to 15.

TABLE 2

| No. | | Sample of the invention | | | | | | | | |
|---|---|---|---|---|---|---|---|---|---|---|
| | | 1 | 2 | 3 | 4 | 5 | 6 | 7 | 8 | 9 |
| Mixing ratio (wt. %) | Sludge slag | 10 | 10 | 10 | 40 | 40 | 40 | 60 | 60 | 60 |
| | Agal-matolite | 45 | 70 | 75 | 25 | 50 | 30 | 30 | 20 | 10 |
| | Clay | 30 | 20 | 10 | 10 | 10 | 10 | 10 | 10 | 10 |
| | Silica sand | 10 | — | — | 20 | — | 20 | — | 10 | 20 |
| | Sodium silicate | 5 | — | 5 | 5 | — | — | — | — | — |
| Water content in formed body (wt. %) | | 7.0 | 6.5 | 6.0 | 6.0 | 6.0 | 6.0 | 6.0 | 5.5 | 5.0 |
| Forming pressure (Kg/cm$^2$) | | 150 | 200 | 200 | 150 | 200 | 200 | 200 | 250 | 250 |
| Firing temperature (°C.) | | 1200 | 1200 | 1180 | 1120 | 1150 | 1160 | 1120 | 1120 | 1120 |
| Water absorption rate (%) | | 0.1 | 0.3 | 0.4 | 0.0 | 0.5 | 0.7 | 0.1 | 0.1 | 0.2 |
| Bulk specific gravity | | 2.30 | 2.29 | 2.28 | 2.45 | 2.43 | 2.39 | 2.46 | 2.46 | 2.45 |
| Bending strength (Kg/cm$^2$) | | 263 | 257 | 260 | 279 | 248 | 220 | 275 | 266 | 254 |

TABLE 3

| No. | | Sample for comparison | | | | | | | |
|---|---|---|---|---|---|---|---|---|---|
| | | 1 | 2 | 3 | 4 | 5 | 6 | 7 | 8 |
| Mixing ratio (wt. %) | Sludge slag | 10 | 10 | 10 | 40 | 40 | 40 | 60 | 60 |
| | Agal-matolite | 10 | 35 | 10 | 10 | 50 | — | 10 | 30 |
| | Clay | — | — | 40 | — | — | 50 | — | — |
| | Silica sand | 75 | 50 | 35 | 50 | 10 | 10 | 30 | 10 |
| | Sodium silicate | 5 | 5 | 5 | — | — | — | — | — |
| Water content in formed body (wt. %) | | 4.5 | 5.0 | 7.5 | 4.5 | 5.5 | 8.0 | 4.0 | 4.5 |
| Forming pressure (Kg/cm$^2$) | | 400 | 250 | 150 | 400 | 250 | 150 | 400 | 300 |
| Firing temperature (°C.) | | 1220 | 1220 | 1220 | 1150 | 1150 | 1150 | 1120 | 1120 |
| Water absorption rate (%) | | 14.2 | 8.0 | 6.4 | 7.5 | 3.8 | 0.1 | 4.6 | 1.9 |
| Bulk specific gravity | | 1.65 | 1.93 | 2.01 | 2.08 | 2.31 | 2.44 | 2.30 | 2.41 |
| Bending strength (Kg/cm$^2$) | | None | 39 | 88 | 124 | 183 | 277 | 126 | 203 |

| No. | | Sample for comparison | | | | | | |
|---|---|---|---|---|---|---|---|---|
| | | 9 | 10 | 11 | 12 | 13 | 14 | 15 |
| Mixing ratio (wt. %) | Sludge slag | 60 | 90 | 90 | — | — | — | — |
| | Agal-matolite | 10 | — | — | 75 | 60 | 60 | 55 |
| | Clay | 30 | 10 | 10 | 20 | 20 | 20 | 20 |
| | Silica sand | — | — | — | — | 20 | 20 | 20 |
| | Sodium silicate | — | — | — | 5 | — | — | 5 |
| Water content in formed body (wt. %) | | 7.0 | 5.0 | 5.0 | 6.5 | 6.5 | 6.5 | 6.5 |
| Forming pressure (Kg/cm$^2$) | | 200 | 250 | 250 | 200 | 200 | 200 | 200 |
| Firing temperature (°C.) | | 1120 | 1050 | 1080 | 1220 | 1220 | 1350 | 1220 |
| Water absorption rate (%) | | 0.0 | 15.3 | 1.4 | 0.3 | 11.7 | 5.6 | 6.3 |
| Bulk specific gravity | | 2.49 | 1.75 | 1.27 | 2.22 | 1.85 | 2.11 | 2.10 |
| Bending strength (Kg/cm$^2$) | | 292 | 17 | 5 | 235 | 131 | 179 | 158 |

Then, a water absorption rate, a bulk specific gravity and a bending strength of the thus prepared samples of the invention Nos. 1 to 9 and the samples for comparison Nos. 1 to 15 were investigated by the application of the water absorption rate test, the bulk specific gravity test and the bending test set forth in JIS (abbreviation of Japanese Industrial Standards) A 5209. The results are shown also in Tables 2 and 3.

As is clear from Table 2, the samples of the invention Nos. 1 to 9 were satisfactory in water absorption rate, bulk specific gravity and bending strength, in spite of the low range of the firing temperature of from 1,120° to 1,200° C.

Figure 3:
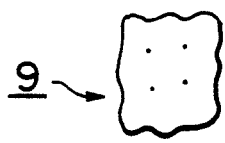
FIG. 3. is an enlarged sectional view illustrating the structure of the ceramic tile in the sample of the present invention No. 4.

FIG. 3. is an enlarged sectional view illustrating the structure of the ceramic tile in the sample of the invention No. 4. In FIG. 3, 9 is the ceramic tile. As shown in FIG. 3, in the sample of the invention No. 4, powders were closely fixed to each other to such an extent that the boundary therebetween was hardly discernible, and there was almost no pores.

In contrast, as is clear from Table 3, all the samples for comparison Nos. 1 to 15 were poor in at least one of water absorption rate, bulk specific gravity and bending strength, as described below.

Figure 4:
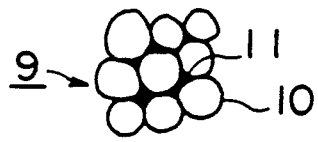
FIG. 4. is an enlarged sectional view illustrating the structure of the ceramic tile in the sample for comparison No. 1.

The sample for comparison No. 1, in which the agalmatolite content was low outside the scope of the present invention, the silica sand content was high outside the scope of the present invention, and clay was not contained, was poor in water absorption rate, bulk specific gravity, and bending strength, in spite of the firing temperature and the forming pressure which were both higher than those in the samples of the invention Nos. 1 to 9. FIG. 4 is an enlarged sectional view illustrating the structure of the ceramic tile in the sample for comparison No. 1. In FIG. 4, 9 is the ceramic tile, 10 are powders, and 11 are pores. As shown in FIG. 4, the original shape of the powders 10 remained in the sample for comparison No. 1, with large pores 11 present between the powders 10, because a prescribed shrinkage did not take place.

The sample for comparison No. 2 was poor in water absorption rate, bulk specific gravity and bending strength in spite of the firing temperature higher than that in the samples of the invention Nos. 1 to 9, because clay was not contained.

The sample for comparison No. 3 was poor in water absorption rate and bending strength in spite of the firing temperature higher than that in the samples of the invention Nos. 1 to 9, because the agalmatolite content was low outside the scope of the present invention. Fine cracks occurred and there was a deformation in the sample for comparison No. 3.

The sample for comparison No. 4 was poor in water absorption rate and bending strength, in spite of the forming pressure higher than that in the samples of the invention Nos. 1 to 9, because the agalmatolite content was low outside the scope of the present invention and clay was not contained.

The sample for comparison No. 5 was poor in water absorption rate and slightly low in bending strength because clay was not contained.

The sample for comparison No. 6 suffered from the occurrence of cracks and was deformed because agalmatolite was not contained.

The sample for comparison No. 7 was poor in water absorption rate and bending strength in spite of the forming pressure higher than that in the samples of the invention Nos. 1 to 9, because the agalmatolite content was low outside the scope of the present invention and clay was not contained.

The sample for comparison No. 8 was slightly poor in bending strength in spite of the forming pressure higher than that in the samples of the invention Nos. 1 to 9, because clay was not contained.

The sample for comparison No. 9 was deformed with the occurrence of a warp, because the agalmatolite content was low outside the scope of the present invention.

The sample for comparison No. 10 had a very narrow range of the firing temperature, because the sludge slag content was high outside the scope of the present invention and agalmatolite was not contained. The firing temperature of 1,050° C. for the sample for comparison No. 10 was lower than the temperature at which the sintering reaction of the formed body could take place, resulting in an insufficient sintering reaction. The sample for comparison No. 10 was therefore poor in water absorption rate, bulk specific gravity and bending strength.

Figure 5:
FIG. 5. is an enlarged sectional view illustrating the structure of the ceramic tile in the sample for comparison No. 11.

The sample for comparison No. 11 having the same chemical composition as that of the sample for comparison No. 10 had also a very narrow range of the firing temperature. The firing temperature of 1,080° C. for the sample for comparison No. 11 was higher than the temperature at which the sintering reaction of the formed body could take place, resulting in over-firing of the sample for comparison No. 11, which remarkably expanded. FIG. 5 is an enlarged sectional view illustrating the structure of the ceramic tile in the sample for comparison No. 11. In FIG. 5, 9 is the ceramic tile, and 11 are pores. As shown in FIG. 5, in the sample for comparison No. 11, powders were closely fixed to each other to such an extent that the boundary therebetween was hardly discernible, but the pores 11 were large enough to permit visual observation because of the expansion. The pores 11 were larger near the surface of the sample for comparison No. 11, so that the sample for comparison No. 11 looked like a pumice stone.

The sample for comparison No. 12 was satisfactory in water absorption rate, bulk specific gravity and bending strength, and had a quality identical with that of the samples of the invention Nos. 1 to 9. However, because the sample for comparison No. 12 did not contain sludge slag, the firing temperature was higher than that in the samples of the invention Nos. 1 to 9. The sample for comparison No. 12 is a typical example of the conventionally used ceramic tiles.

The sample for comparison No. 13 was poor in water absorption rate, bulk specific gravity and bending strength in spite of the firing temperature higher than that in the samples of the invention Nos. 1 to 9, because sludge slag was not contained.

The sample for comparison Nos. 14 and 15 were poor in water absorption rate and bending strength in spite of the firing temperature higher than that in the samples of the invention Nos. 1 to 9, because sludge slag was not contained.

According to the present invention, as described above in detail, it is possible to obtain a ceramic tile using a sludge slag, which permits effective utilization of sludge contained in sewage and reduction of the raw material cost of ceramic tiles, thus providing industrially useful effects.

What is claimed is:
1. A ceramic tile produced by
  (i) mixing composition which comprises:
    (a) a sludge slag obtained by separating sludge from sewage, burning the thus separated sludge to form an ash, melting said ash and solidifying the thus melted ash: from 5 to 70 wt. %,
    (b) agalmatolite: from 20 to 90 wt. %,
    (c) clay: from 5 to 50 wt. %, and

(d) the balance being incidental impurities,
where the total amount of sodium oxide (Na$_2$O) and potassium oxide (K$_2$O) as said incidental impurities being up to 5 wt. %; and
said sludge slag consisting essentially of;
silicon dioxide (SiO$_2$): from 10 to 50 wt. %,
aluminum oxide (Al$_2$O$_3$): from 3 to 20 wt. %,
phosphorus pentoxide (P$_2$O$_5$): from 1 to 30 wt. %,
calcium oxide (CaO): from 10 to 70 wt. %,
magnesium oxide (MgO): from 0.5 to 20 wt. %, and
iron oxide (Fe$_2$O$_3$): from 5 to 25 wt. %,
wherein said calcium oxide (CaO) content to said silicon dioxide (SiO$_2$) content being in a ratio within a range of from 0.2 to 7.0, and
said sludge slag having a melting point within a range of from 1,120° to under 1,200° C.; and
(ii) firing the composition to produce a ceramic tile.

2. The ceramic tile as claimed in claim 1, wherein:
said ceramic tile further comprise silica sand in an amount within a range of from 1 to 50 wt. %.

3. A ceramic tile as claimed in claim 1 or 2, wherein:
said ceramic tile further comprises an alkaline element in an amount within a range of from 1 to 5 wt. %.

4. A ceramic tile as claimed in claim 3, wherein:
at least one of sodium silicate (Na$_2$SiO$_3$) and potassium silicate (K$_2$O SiO$_2$) is used as said alkaline element.

5. The ceramic tile as claimed in claim 2, wherein the sludge slag is in an amount of weight 10, the agalmatolite is in an amount of 45 weight %, the clay is in an amount of 30 weight %, the silica sand is in an amount of 10 weight %, and said ceramic tile further comprising 5 weight % sodium silicate.

6. The ceramic tile as claimed in claim 1, wherein the sludge slag is in an amount of 10 weight %, the agalmatolite is in an amount of 70 weight % and the clay is in an amount of 20 weight %.

7. The ceramic tile as claimed in claim 2, wherein the sludge is in an amount of 10 weight %, the agalmatolite is in an amount of 75 weight %, the clay is in an amount of 10 weight %, and said ceramic tile further comprises 5 weight % sodium silicate.

8. The ceramic tile as claimed in claim 2, wherein the sludge slag is in an amount of 40 weight %, the agalmatolite is in an amount of 25 weight %, the clay is in an amount of 10 weight ceramic tile further comprises 5 weight % sodium silicate.

9. The ceramic tile as claimed in claim 1, wherein the sludge slag is in an amount of 40 weight %, the agalmatolite is in an amount of 50 weight %, the clay is in an amount of 10 weight %.

10. The ceramic tile as claimed in claim 2, wherein the sludge slag is in an amount of 40 weight %, the agalmatolite is in an amount of 30 weight %, the clay is in an amount of 10 weight %, and the silica sand is in an amount of 20 weight %.

11. The ceramic tile as claimed in claim 1, wherein the sludge slag is in an amount of 60 weight %, the agalmatolite is in an amount of 30 weight %, and the clay is in an amount of 10 weight %.

12. The ceramic tile as claimed in claim 2, wherein the sludge slag is in an amount of 60 weight %, the agalmatolite is in an amount of 20 weight %, the clay is in an amount of 10 weight % and the silica sand is in an amount of 10 weight %.

13. The ceramic tile as claimed in claim 2, wherein the sludge slag is in an amount of 60 weight %, the agalmatolite is in an amount of 10 weight %, the clay is in an amount of 10 weight %, the silica sand is in an amount of 20 weight %.

* * * * *

UNITED STATES PATENT AND TRADEMARK OFFICE
CERTIFICATE OF CORRECTION

PATENT NO. : 5,175,134
DATED : December 29, 1992
INVENTOR(S) : KANEKO et al

It is certified that error appears in the above-identified patent and that said Letters Patent is hereby corrected as shown below:

Column 12, line 62 (claim 1, line 2):

before "composition", insert -- a --.

Column 13, line 16 (claim 1, line 24):

change "1,120°" to -- 1,120 --.

Column 13, line 19 (claim 2, line 2):

change "comprise" to -- comprises --.

Column 13, line 21 (claim 3, line 1):

change "A" to -- The --.

Column 13, line 25 (claim 4, line 1):

change "A" to -- The --.

Column 13, line 30 (claim 5, line 2):

change "weight 10" to -- 10 weight % --.

Column 13, line 32 (claim 5, line 4):

change "30" to -- 10 --.

Column 13, line 33 (claim 5, line 5):

change "10" to -- 30 --.

UNITED STATES PATENT AND TRADEMARK OFFICE
CERTIFICATE OF CORRECTION

PATENT NO. : 5,175,134
DATED      : December 29, 1992
INVENTOR(S): KANEKO et al

It is certified that error appears in the above-identified patent and that said Letters Patent is hereby corrected as shown below:

Column 14, line 4 (claim 7, line 2):

after "sludge", insert -- slag --.

Column 14, line 11 (claim 8, line 4):

after "weight", insert -- %, the silica sand is in an amount of 20 weight %, and said --.

Column 14, line 15 (claim 9, line 3):

after "%,", insert -- and --.

Column 14, line 34 (claim 13, line 4):

after "%,", insert -- and --.

Signed and Sealed this

Eleventh Day of January, 1994

Attest:

BRUCE LEHMAN

Attesting Officer     Commissioner of Patents and Trademarks